(12) United States Patent
Hartwig

(10) Patent No.: US 11,417,187 B2
(45) Date of Patent: Aug. 16, 2022

(54) SCATTERED LIGHT DETECTOR AND SUCTION FIRE DETECTION SYSTEM HAVING A SCATTERED LIGHT DETECTOR

(71) Applicant: Wagner Group GmbH, Langenhagen (DE)

(72) Inventor: Jonas Hartwig, Hannover (DE)

(73) Assignee: Wagner Group GmbH, Langenhagen (DE)

( * ) Notice: Subject to any disclaimer, the term of this patent is extended or adjusted under 35 U.S.C. 154(b) by 22 days.

(21) Appl. No.: 16/972,047

(22) PCT Filed: Jun. 12, 2019

(86) PCT No.: PCT/EP2019/065373
§ 371 (c)(1),
(2) Date: Feb. 24, 2021

(87) PCT Pub. No.: WO2019/243135
PCT Pub. Date: Dec. 26, 2019

(65) Prior Publication Data
US 2021/0174659 A1    Jun. 10, 2021

(30) Foreign Application Priority Data
Jun. 19, 2018 (EP) .................... 18020263

(51) Int. Cl.
*G08B 17/107*    (2006.01)
*G01N 21/53*    (2006.01)

(52) U.S. Cl.
CPC ......... *G08B 17/107* (2013.01); *G01N 21/53* (2013.01)

(58) Field of Classification Search
None
See application file for complete search history.

(56) References Cited

U.S. PATENT DOCUMENTS 6,605,804 B1* 8/2003 Muller-Fiedler ..... G01N 21/783
356/402
2003/0117623 A1* 6/2003 Tokhtuev ............... G01N 21/53
356/338

(Continued)

FOREIGN PATENT DOCUMENTS

| EP | 3327688 A1 | 5/2018 |
|---|---|---|
| GB | 1179409 A | 1/1970 |
| WO | 2009036988 A1 | 3/2009 |

*Primary Examiner* — John F Mortell
(74) *Attorney, Agent, or Firm* — Frank H. Foster; Kremblas & Foster

(57) ABSTRACT

A scattered light detector for the detection of particles, having a test section with a flow inlet and a flow outlet for forming a flow path through which the test fluid can flow, a light transmitter, which transmits a light beam in a radiation direction, with the transmitted light beam forming an intersection region with the flow path, a light receiver for receiving a scattered light fraction scattered on smoke particles in the intersection region, and a printed circuit board. The light transmitter and the light receiver are connected to the printed circuit board, with the light beam transmitted by the light transmitter being guided into the test section by means of an optical fiber deflecting the light beam, and the light receiver is arranged in such a manner that a direct or indirect scattered light path runs between the light receiver and the intersection region.

13 Claims, 5 Drawing Sheets

(56) References Cited

U.S. PATENT DOCUMENTS

2013/0208281 A1* 8/2013 Masumoto ............. G08B 17/10
356/438
2017/0358189 A1* 12/2017 Schmidt ............... G08B 17/113

* cited by examiner

SCATTERED LIGHT DETECTOR AND SUCTION FIRE DETECTION SYSTEM HAVING A SCATTERED LIGHT DETECTOR

BACKGROUND OF THE INVENTION

The invention relates to a scattered light detector for detecting particles, in particular smoke particles in a test fluid, in particular for use in a suction fire detection system, having a test region which has a flow inlet and a flow outlet to form a flow path through which the test fluid can flow, a light emitter, which emits a light beam in an emission direction, wherein the emitted light beam forms an intersection region with the flow path, a light receiver for receiving a scattered light component scattered on particles in the intersection region, and a circuit board, wherein the light emitter and the light receiver are connected to a circuit board, in particular a front side of the circuit board. The invention also relates to a suction fire detection system having such a scattered light detector, wherein the suction fire detection system has one or more suction openings which are arranged for suctioning a test fluid into one or more monitoring spaces, a pipe and/or hose system for the fluid-conducting connection of the one or more suction openings to the scattered light detector, and a suction device for generating a flow and/or a negative pressure within the pipe and/or hose system. Finally, the invention relates to an associated method for detecting particles contained in a test fluid, in particular smoke particles, in particular for detecting a fire.

In addition to fire detection and monitoring of a room using simple ceiling smoke detectors, scattered light detectors are suitable for use in so-called suction fire detection systems, also known as suction smoke detectors, which continuously section a sufficiently representative amount of test fluid, in particular amount of air, out of a monitoring space, a room or region to be monitored, or an environment to be monitored, and feed it to the scattered light detector arranged in the suction path. The suctioned test fluid is guided along a flow path through a test region of the scattered light detector, wherein a light beam emitted by the light emitter is oriented onto the test region. For use as light emitters, diodes, so-called light-emitting diodes (LED), also referred to simply as light-emitting diodes, have proven successful. A first intersection volume, in which the emitted or transmitted light beam and the flow path of the test fluid intersect, forms an intersection region within which possibly present aspirated particles, in particular smoke particles, cause the incident light to be scattered. To detect the scattered light, a field of view of a light receiver, usually a photodiode (PD), is oriented in a receiving direction onto the intersection region. A second intersection volume, in which the light beam of the light emitter and the field of view of the light receiver coincide, is called the scattered light center. A third intersection volume, in which the intersection region and the scattered light center, i.e., the light beam of the light emitter, the field of view of the light receiver, and the flow path of the test fluid intersect, forms a detection volume. A scattered light component of the scattered light scattered there by possibly present, in particular aspirated particles or smoke particles, is detected by the light receiver and used to detect a fire by means of a subsequent evaluation. Due to the high sensitivity of suction fire detection systems, fire detection is often already possible during the development phase of the fire, because of which suction smoke detectors are associated with the so-called early fire detection or even ultra-early fire detection.

A generic photoelectric particle sensor for detecting scattered light scattered on particles for a suction fire detection system is known from EP 0 729 024 A2. The particle sensor comprises an optical chamber enclosed by a housing and having an air inlet and an air outlet. The optical chamber forms an air passage in that the aspirated air is guided into the chamber via an air inlet and out of the chamber via an air outlet. The light emitter and the light receiver are arranged inside the optical chamber or protrude into it and are therefore in direct contact with the air passage. This results in a complex structure of the optical chamber and accompanying soiling and particle deposits and, as a result, a reduced sensitivity or increased error rate of the particle sensor. Moreover, structurally separate circuit carriers and/or circuit boards are necessary for the power supply of the light emitter and the light receiver and for relaying the received signals, whereby increased production costs are caused due to more complex production.

A scattered light smoke detector is described in EP 3 029 647 B1, which has a circuit carrier accommodated in a housing shell. Both a light-emitting diode as a light emitter and also a photodiode as a light receiver are connected to this circuit carrier. The lowest possible overall height of the scattered light smoke detector is made possible by the fact that the diodes are connected directly, i.e., immediately and without additional substructures, for example as surface-mountable components (SMD=Surface Mounted Device) to the circuit carrier. The emitting direction or the receiving direction of conventional diodes thus necessarily extends orthogonally to the circuit carrier. At least one of the diodes is embodied as a so-called "side-looker" LED in order to form a scattered light center, that is to say an intersection volume in which the emitted light beam of the light-emitting diode and the field of view of the photodiode intersect. By using such a "side-looker" LED, a "lateral" emission direction, parallel to the circuit carrier, can be achieved. The disadvantage of this embodiment is, on the one hand, that the entire circuit carrier with all active optical components is arranged within the test fluid, here directly within the monitoring space or the environment to be monitored; on the other hand, the emission and reception directions of the diodes are limited to a parallel ("side-looker" diode) or orthogonal arrangement (conventional diode) with respect to the circuit carrier.

Various possible arrangements of the light receiver in relation to the light emitter are known from the prior art. The angle spanned between the emission direction of the emitted light beam and the viewing direction of the light receiver is referred to as the scattering angle. With a scattering angle between 0° and 90° one refers to forward scattering, with a scattering angle greater than 90° one refers to backward scattering. Moreover, various options for deflecting and/or reflecting the light beam emitted by a light-emitting diode or the scattered light path of a scattered light component are known from the prior art.

In the following and according to the usual understanding, the term "reflection" describes the one-time change in direction of a light beam by means of a reflector, for example a mirror. A light beam incident on the surface of the reflector is thrown back (reflected) by it, wherein the angle of incidence of the light beam is equal to the angle of reflection. The expression "deflection" of a light beam, on the other hand, describes the change in the direction of the light beam by means of an optical waveguide, for example an optical fiber. In contrast to single reflection, the light beam enters the medium of the optical waveguide and is relayed in its interior, which means that any changes in direction are possible. The angle of incidence of the light beam in the optical waveguide therefore does not have to correspond to the exit angle. In contrast, the expression "focusing" of a light beam does not mean a change in direction. Refraction, for example by means of a converging lens, increases the light intensity and/or changes the width of the field of view of a photodiode or the light beam of a light-emitting diode.

The use of a lens in the field of photoelectric detection is known, for example, from EP 2 881 719 A1 in conjunction with spark detection. In contrast to particle detection, in particular smoke particle detection, the use of a light emitter can be dispensed with in spark detection, since the sparks to be detected already serve as a light source themselves. The actual light receiver is arranged here outside a channel in which a combined material and gas flow to be monitored flows. An optical rod relays the radiation emitted by the sparks to the light receiver and protrudes into the channel, where it is shielded from the flow of material and gas by means of a lens. At the same time, the width of the field of view is changed, in particular enlarged, depending on the design of the lens.

An optical scattered light detector is known from U.S. Pat. No. 9,267,885 B2, in which it is proposed that the emission direction of the light beam of a light emitting diode and the scattered light path of a scattered portion of scattered light be changed by means of two light reflectors, in particular prisms, protruding into a measuring chamber. In this case, a first prism is oriented at the light-emitting diode in order to reflect its light beam at an angle into a detection zone within the measuring chamber, and a second prism is oriented at a photodiode in order to reflect the scattered light originating from the detection zone at the same angle in the direction of the photodiode. The light reflectors are arranged on a common support part which connects them indirectly to a circuit board. A similar structure of a scattered light detector is also known from WO 2016/102891 A1, which differs from the structure described above essentially in that instead of the two prisms, two light guides protruding into the measuring chamber are used. By means of the respectively proposed arrangement of the diodes and the respective reflectors or light guides in relation to one another, only the detection of forward scattering is possible in a limited scattering angle range.

It is therefore an object of the present invention to provide a scattered light detector which is improved over the prior art and which has, in particular, a more cost-effective, more compact, and more long lived design with a simultaneously high response sensitivity that remains constant over the operating time, a lower false alarm rate, and detection accuracy, in particular to meet the special demands on a suction fire detection system, such as the comparatively small available installation space.

SUMMARY OF THE INVENTION

According to the invention, the object is achieved by a scattered light detector according to claim 1, a suction fire detection system having a scattered light detector according to claim 13, and a method for detecting particles, in particular smoke particles, contained in a test fluid according to claim 15.

A scattered light detector according to the invention of the type specified at the outset is characterized in that the light beam emitted by the light emitter is conducted into the test region by means of an optical waveguide deflecting the light beam and the light receiver is arranged in such a way that a direct or indirect scattered light path extends between the light receiver and the intersection region.

In an advantageous embodiment, the light emitter, in particular a light-emitting diode (LED) and/or the light receiver, in particular a photodiode (PD) are connected directly or immediately, i.e., without additional or intermediate substructures or as surface-mountable components (also SMD=Surface Mounted Device) to one side of the circuit board, to its front side, and face orthogonally away from the circuit board or the emission direction of the light emitter and the field of view of the light receiver are aligned orthogonally to the front side of the circuit board. The front side of the circuit board refers to the side of the circuit board that faces toward or is closest to the test region. In principle, all components mounted on the circuit board can be attached to the front of the circuit board. However, equipping the printed circuit board on both sides, on the front side and on the rear side opposite to the front side and facing away from the test region, is also conceivable. For example, circuits for controlling the light emitter or for amplifying and evaluating the light receiver signal can also be arranged on the circuit board.

Energy-converting optical components that, for example, consume or generate electrical energy, such as the light emitter or the light receiver, are also referred to below as active optical components. Optical components without significant energy conversion such as lenses, optical waveguides, or filters are also referred to below as passive optical components.

Expediently, a light trap for absorbing a non-scattered light component of the light beam emitted by the light emitter can also be arranged within the test region.

According to the invention, it is therefore provided that the light beam emitted by the light emitter, in particular extending orthogonally to the front side of the circuit board, is deflected by an optical waveguide and oriented into the test region in order to form an intersection region with the test fluid flowing along the flow path within the test region. The light receiver is arranged on the circuit board in such a way that a direct scattered light path is formed between the intersection region and the light receiver, i.e., a straight, non-reflected, and non-deflected course of a scattered light component scattered on a particle in the intersection region. Alternatively, the light receiver is arranged in such a way that an indirect scattered light path is formed between the intersection region and the light receiver, i.e., a "kinked" and/or "curved", more reflected and/or deflected course of a scattered light component scattered on a particle in the intersection region.

In other words, to form a direct scattered light path, the field of view of the light receiver is oriented in a receiving direction directly or immediately onto the intersection region. In this way, the scattered light center, in which the light beam of the light emitter and the field of view of the light receiver intersect, can be placed with a small number of optical components and thus with little effort within the intersection region in which the emitted or transmitted light beam of the light emitter and the flow path of the test fluid intersect, to form the detection volume. Correspondingly, an indirect scattered light path is formed when the field of view of the light receiver is not oriented directly or immediately onto the intersection region, but rather, in particular passive, optical components for reflecting or deflecting the scattered light component are arranged within the field of view of the light receiver and are thus used for placing the scattered light center within the intersection region.

The invention therefore provides a modifiable structure of a scattered light detector having a large number of options for arranging optical components, in which all active optical components are arranged either on multiple circuit boards lying in a common plane or, advantageously, on a single circuit board, in particular on the front side of this circuit board/these circuit boards, the light beam of the light emitter is deflected if necessary using an optical waveguide to form the intersection region with the test fluid, and the light receiver is arranged, if necessary and/or optionally, to form a direct or an indirect scattered light path between the intersection region and the light receiver. In particular, a flexible structure enables an adapted use of the scattered light detector for a suction fire detection system, in that the light beam of the light emitter can be oriented onto the flow path of the test fluid and the light receiver, to form the scattered light center or the detection volume within the intersection region and to detect the scattered light component scattered in the detection volume, is either oriented directly on the intersection region or the intersection region is located within the field of view of the light receiver or is oriented indirectly on the intersection region or the intersection region is located outside the field of view of the light receiver, and the scattered light component is deflected or reflected by means of an, in particular passive, optical component, preferably an optical waveguide. In this way, a minimal number of components, in particular active and passive optical components, can be implemented, which in particular reduces the production effort and the production costs resulting therefrom. By arranging all active optical components on a single circuit board, additional production costs are saved and the structure of the scattered light detector is significantly simplified. In a particularly advantageous embodiment, both all active optical components and also passive optical components are arranged outside the flow path of the test fluid, in particular outside the test region, or only the passive optical component, the optical waveguide, which deflects the light beam of the light emitter protrudes into the test region. In this way, soiling of the test region by particle deposits on optical components, which occur more frequently in suction fire detection systems, can be significantly reduced or even completely avoided.

In one advantageous embodiment of the invention, the light beam emitted by the light emitter extends in an emission direction oriented along the flow path.

Alternatively to this embodiment, the light beam emitted by the light emitter preferably extends in an emission direction oriented onto the flow path.

Because the light beam emitted by the light emitter extends in an emission direction oriented along the flow path, in particular in parallel to the flow path, a larger intersection region of the light beam and the flow path can be formed. In order to use the enlarged intersection region for a multidetection, i.e., the detection of scattered light by means of multiple light receivers, multiple respective scattered light centers can be placed within the flow path by means of this in order to form associated detection volumes in various regions of the test region. Alternatively, by aligning the light beam in an emission direction oriented onto the flow path, in particular in an emission direction extending orthogonally to the flow path, a more precise delimitation of the detection volume is possible, in that a smaller intersection region is formed between the light beam and the flow path. In addition to the borderline cases of a light beam oriented in parallel to the flow path, in which an intersection angle between the flow path of the test fluid and the emission direction of the light emitter is 0°, or a light beam oriented orthogonally to the flow path, in which the intersection angle is 90°, emission directions in between are also settable, which span an intersection angle in a range between 0° and 90°.

One advantageous embodiment of the scattered light detector is distinguished in that a non-reflective, non-deflecting optical component or medium is arranged within the direct scattered light path extending between the light receiver and the intersection region. Such a non-reflective, non-deflecting optical component or medium is, for example, a lens or simple window glass.

In an alternative embodiment of the scattered light detector, the indirect scattered light path extending between the light receiver and the intersection region is formed by means of an optical waveguide which deflects the scattered light component that is scattered. As a result, the light receiver can be arranged at almost any position on the circuit board and the available space can thus be better used.

According to this, either no optical components at all and exclusively the medium present in the test region or test fluid aspirated into the test region, usually air, or exclusively neither reflective nor deflecting, in particular passive, optical components such as a lens or simple window glass, are arranged within a direct scattered light path. In contrast, an indirect scattered light path is preferably formed by means of an optical waveguide which deflects the scattered light component that is scattered.

According to a further, preferred embodiment, a first optical unit, preferably a flat or planar first optical unit, for focusing the light beam, is arranged between the light emitter and the intersection region and/or a second optical unit, preferably a flat or flat second optical unit, for focusing a component of scattered light scattered along the scattered light path, is arranged between the light receiver and the intersection region.

The use of preferably flat or planar, passive symmetrical optical units, which bundle or scatter light incident in parallel to their optical axis, allows the light beam of the light emitter and/or the scattered light components scattered in the scattered light path to be focused and the width and/or light intensity of the light beam and/or the scattered light component or the field of view of a light receiver to be varied. This can be achieved, for example, by lenses, in particular converging or diverging lenses, but also so-called Fresnel lenses. Preferably, the first and/or the second optical unit is arranged aligned in parallel or at an angle, in particular in a range between 0° and 45°, in relation to the front side of the circuit board and/or opposite to an associated light emitter or light receiver. In a simpler embodiment, instead of a lens, window glass can optionally be used as the first or second optical unit.

The arrangement of a converging lens in front of the light emitter, in particular the light-emitting diode, enables, for example, a punctiform formation of the intersection region in which the flow path of the test fluid and the light beam of the light emitter intersect. The arrangement of a converging lens in front of the light receiver, in particular the photodiode, on the other hand, results in an enlarged detection region. The scattered light component incident on the converging lens is bundled, wherein the focal point is aligned on the light receiver. In this way, it is possible to "intercept" and detect scattered light components that would otherwise pass by the light receiver.

It is also advantageous if, in a preferred embodiment, the test region is delimited by a test region wall, wherein the test region wall has one or more recesses for accommodating optical components and/or for creating one or more light passages.

In a refinement of this embodiment, the circuit board having the light emitter and the light receiver is arranged outside the test region wall delimiting the test region.

Likewise, in a refinement of this embodiment, the light receiver and/or the light emitter and/or the optical waveguide and/or the first optical unit and/or the second optical unit and/or further optical components can be arranged outside the test region, in particular outside the test region wall delimiting the test region.

In a particularly advantageous refinement, a light passage or a non-reflective optical component is then arranged within the direct scattered light path extending between the light receiver and the intersection region and/or the indirect scattered light path extending between the light receiver and the intersection region is formed by means of an optical waveguide arranged within one of the recesses of the test region wall and in the field of view of the light receiver.

In this case, the optical waveguide deflecting the light beam of the light emitter can preferably open within one of the recesses in the test region wall or the optical waveguide will be accommodated by a recess. Alternatively, the optical waveguide passes through the recess and opens into the test region. To form a direct scattered light path, the light receiver can be associated with a lens located within a recess or a light passage, for example a gap formed within the test region wall, so that exclusively the medium and/or test fluid, generally air, present in the monitoring space or in the environment to be monitored or in the environment to be monitored is arranged within the scattered light path. The circuit board, the active optical components connected to it, and in particular also all passive optical components are thus preferably arranged outside the test region and are accommodated within corresponding recesses, so that the optical components terminate flush with the test region wall. This can result in a particularly low level of soiling of the test region due to particle deposits on optical components and/or on the test region wall and thus a particularly long lifetime of the scattered light detector can be ensured.

If the test region wall is designed having a circular cylindrical cross section, a flow with as little turbulence as possible, ideally even laminar flow, can also be formed within the test region. In addition, the use in a suction fire detection system is considerably simplified. In one particularly preferred embodiment it is therefore conceivable to use a line section of the pipe and/or hose system of the suction fire detection system itself as a test region wall. Due to the variable arrangement and alignment options for the light receiver, the scattered light detector may be adapted to the geometric specifications of the suction fire detection system. Since a single circuit board is used to accommodate all active optical components and, if necessary, all other components for control and evaluation, moreover a housing surrounding the test region wall and the circuit board arranged outside the test region wall can be embodied to be particularly space-saving and adapted to the small installation space available.

According to one advantageous embodiment variant, the scattered light detector is distinguished by one or more additional light receivers, which are connected as secondary light receivers to the circuit board, in particular to the front side of the circuit board.

In a refinement of this embodiment variant, the one or more secondary light receivers are also arranged in such a way that a direct or indirect scattered light path extends between the respective secondary light receiver and the intersection region.

In addition to the light receiver, further secondary light receivers, preferably adjacent to it, can thus be connected to the front side of the circuit board. The one or more secondary light receivers are designed to be essentially identical to the light receiver, for example as a photodiode, and can each optionally and/or if necessary be formed in corresponding possible configurations and/or alignments and/or arrangements of the light receiver. In particular, the one or more secondary light receivers can be connected directly or indirectly to the circuit board and a direct or indirect scattered light path can extend between the intersection region and the respective secondary light receiver. The one or more secondary light receivers can be used, for example, for multi-detection, that is to say for the detection of scattered light components scattered at different scattering angles in the intersection region by means of multiple light receivers. In addition to the formation of a plurality of scattered light centers associated with a respective secondary light receiver within the intersection region, it is particularly expedient to arrange the one or more secondary light receivers in such a way and/or to align their respective field of view in such a way that they form a common scattered light center with the light emitter within the intersection region or a common detection volume. Optionally or alternatively, it is therefore conceivable to connect the one or more secondary light receivers to the circuit board at a respective detection angle in order to align their respective field of view in the required receiving direction on the intersection region, in particular to form a common scattered light center within the intersection region and thus a common detection volume. By means of the light receiver and the one or more secondary light receivers, different scattered light components scattered at characteristic or particle-specific scattering angles differing from one another can thus be detected in the common detection volume.

Due to the flexible arrangement options of the light receiver and the one or more secondary light receivers, they can even be arranged on a common circuit board in a space-saving manner and at the same time increase the evaluation options of the scattered light detector. In particular, the scattering-angle-dependent scattered light distribution can be included in the evaluation, whereby, for example, fire variables can be distinguished from deceptive variables (for example, dust or vapor particles).

In addition, one or more second optical units, preferably flat or planar first or second optical units, can be arranged for focusing a scattered light component in a respective scattered light path between the one or more secondary light receivers and the intersection region.

The one or more second optical units are preferably each aligned in parallel to or at an angle to the front side of the circuit board and/or are arranged opposite to the associated secondary light receiver and in particular are accommodated within recesses of a test region wall surrounding the test region.

In one refinement of the variant embodiment, it is then particularly advantageous that the one or more second optical units are each arranged tangentially to a common perimeter surrounding the flow path and/or each have the same distance from the intersection region.

For example, when using a test region wall having circular cylindrical cross section, multiple second optical units, preferably flat or planer second optical units, in particular converging lenses, can be accommodated by recesses of the test region wall which extend along a common circumference. The optical units, which are preferably designed as converging or Fresnel lenses, in this arrangement are each at the same distance from the flow path of the test fluid, which expediently extends along a central axis of the test region wall, or from the intersection region of the light beam of the light emitter with the flow path. This makes it easier to focus the respective receiving direction of the secondary light receivers within a common detection volume and at the same time increases the width of the respective field of view.

Finally, according to an advantageous embodiment, at least one polarization filter can be arranged in each case within the respective direct or indirect scattered light path of two or more of the secondary light receivers or of the light receiver and at least one of the secondary light receivers.

The polarization planes of the polarization filters are preferably orthogonal to one another, as a result of which additional analysis information can be obtained on the basis of the respective filtered, detected scattered light component.

A suction fire detection system according to the invention of the type described in more detail at the outset having a scattered light detector according to one of the embodiments described above is distinguished in that a test region of the scattered light detector is formed as an integral part of the pipe and/or hose system, in that the test region is formed as a flow section, in particular a supply pipe, of the pipe and/or hose system.

Providing a suction fire detection system having an integrated scattered light detector is thus also to be provided according to the invention. The scattered light detector is embodied here as an integrated, preferably even as an integral component of the pipe and/or hose system. In the integrated embodiment, the scattered light detector is installed in the pipe and/or hose system in such a way that the flow enters the test region through an inlet of the detector and leaves it again through an outlet of the detector. In the integral embodiment, the pipe and/or hose wall even forms the test region wall at the same time, so that the test region can be incorporated, for example, as a so-called pipe fitting in the pipe and/or hose system. In this way, even existing suction fire detection systems may be retrofitted simply and easily with the scattered light detector according to the invention.

An advantageous embodiment of the suction fire detection system is distinguished in that a test region wall delimiting the test region is arranged in the flow direction of the test fluid in front of, in particular directly in front of, the suction device.

The scattered light detector is expediently arranged within the pipe and/or hose system of the suction fire detection system in front of, in particular directly in front of its suction device. On the one hand, the longest possible, straight flow path of the test fluid within the pipe and/or hose system can be used in this way, whereby a more uniform distribution of the particles within the test fluid or a less turbulent flow of the test fluid can be achieved. On the other hand, test fluid quantities originating from various branches of the pipe and/or hose system and taken from a respective monitoring space can be checked and evaluated by means of the same scattered light detector. To determine the origin or localize the different test fluid quantities, the use of additional decentralized scattered light detectors within, in particular in different branches of the pipe and/or hose system is reasonable. These decentralized scattered light detectors are preferably also embodied according to at least one embodiment of the present invention.

In a method according to the invention for detecting particles, in particular smoke particles, contained in a test fluid using a scattered light detector, in particular according to one of the embodiments described above, which scattered light detector has a light emitter for forming an intersection region and a light receiver for detecting scattered light scattered within the intersection region, a test fluid is continuously taken from one or more monitoring spaces and supplied by means of a fluid-conducting pipe and/or hose system to the scattered light detector.

The method according to the invention is distinguished in that the intersection region is formed within the pipe and/or hose system and the light receiver is oriented onto the intersection region to form a detection volume, wherein a flow path guiding the test fluid is created along a flow section of the pipe and/or hose system and the light emitter emits a light beam in an emission direction oriented onto the flow path or along the flow path, wherein the emitted light forms the intersection region with the flow path. Optionally, the light receiver receives at least a scattered light component of the scattered light scattered within the intersection region, provided that particles are present within the test fluid.

In the scope of the invention, it is thus provided that the intersection region is formed within the pipe and/or hose system, in that both the light beam emitted by the light emitter and also the flow path guiding the test fluid meet one another within a flow section of the pipe and/or hose system. The flow section can be integrated for this purpose into the pipe and/or hose system, i.e. a test region enclosed by a preferably circular cylindrical test region wall replaces a flow section of the pipe and/or hose system or is additionally interconnected or is integrally formed with the pipe and/or hose system, i.e. a flow section of the pipe and/or hose system is itself used as a test region within which the flow path is formed. To detect at least one scattered light component of the scattered light scattered within the intersection region, the light receiver, in particular its field of view, is also oriented onto the intersection region, wherein a scattered light center, in particular a detection volume, is formed within the pipe and/or hose system. A scattered light path extending between the intersection region and the light receiver can be formed directly or indirectly alternately and/or as needed in this case.

Further steps for evaluating the detected scattered light component for the presence of a fire or a fire hazard or the risk of a fire developing are sufficiently known from the prior art.

It should be pointed out that the features and measures set forth individually in the preceding and following description can be combined with one another in any technically reasonable manner and disclose further designs of the invention. The description additionally characterizes and specifies the invention, in particular in conjunction with the figures.

DESCRIPTION OF THE SEVERAL VIEWS OF THE DRAWINGS

Further advantageous designs of the invention are disclosed in the following description of the figures. In the figures

In the different figures, the same parts are always provided with the same reference numerals, because of which they are generally also only described once.

While the viewing direction of the observer in FIGS. 2 and 3 is orthogonal to the flow course of the test fluid, FIGS. 4 to 9 are formed as views in the flow direction of the test fluid.

DETAILED DESCRIPTION OF THE INVENTION

Figure 1:
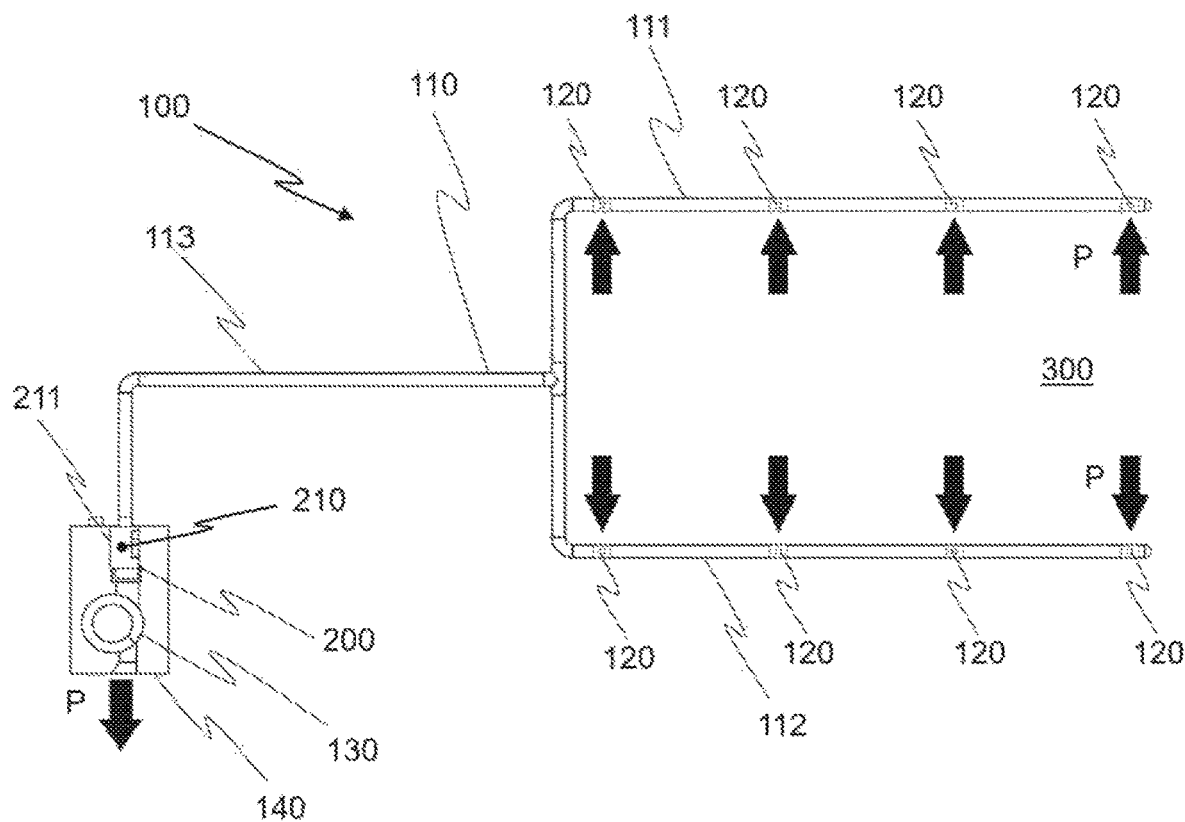
FIG. 1 shows an exemplary, schematic illustration of a suction fire detection system according to the invention having an integrated scattered light detector.

FIG. 1 shows an exemplary, schematic illustration of a suction fire detection system 100 according to the invention having an integrated scattered light detector 200. The suction fire detection system 100 has a pipe and/or hose system 110 having a first pipe branch 111 and a second pipe branch 112. The pipe branches 111, 112 each comprise multiple suction openings 120 which are arranged in one or more monitoring spaces 300 to aspirate a test fluid. For example, it is conceivable that the first pipe branch 111 and the second pipe branch 112 are arranged in different, structurally separate monitoring spaces 300, wherein multiple suction openings 120 are associated with each monitoring space 300. The pipe and/or hose system 110 additionally has a supply pipe 113 for the fluid-conducting connection of the suction openings 120 and the pipe branches 111, 112 to the scattered light detector 200. In order to generate a negative pressure and/or a flow within the pipe and/or hose system 110, a suction device 130 is provided. By means of the suction device 130, an amount of test fluid can be taken from each of the one or more monitoring spaces 300 via the suction openings 120 and supplied in a flow direction P of the test fluid, which is illustrated by the arrows, via the pipe and/or hose system 110 to the scattered light detector 200. The scattered light detector 200 is embodied here as an integrated component of the pipe and/or hose system 110, in that its test region 210, which is delimited by a test region wall 211, replaces a flow section and/or line section, in particular of the supply pipe 113 of the pipe and/or hose system 110 and is arranged directly in front of the suction device 130 in the flow direction P of the test fluid. The scattered light detector 200 and the suction device 130 are enclosed by a common housing 140.

Figure 2:
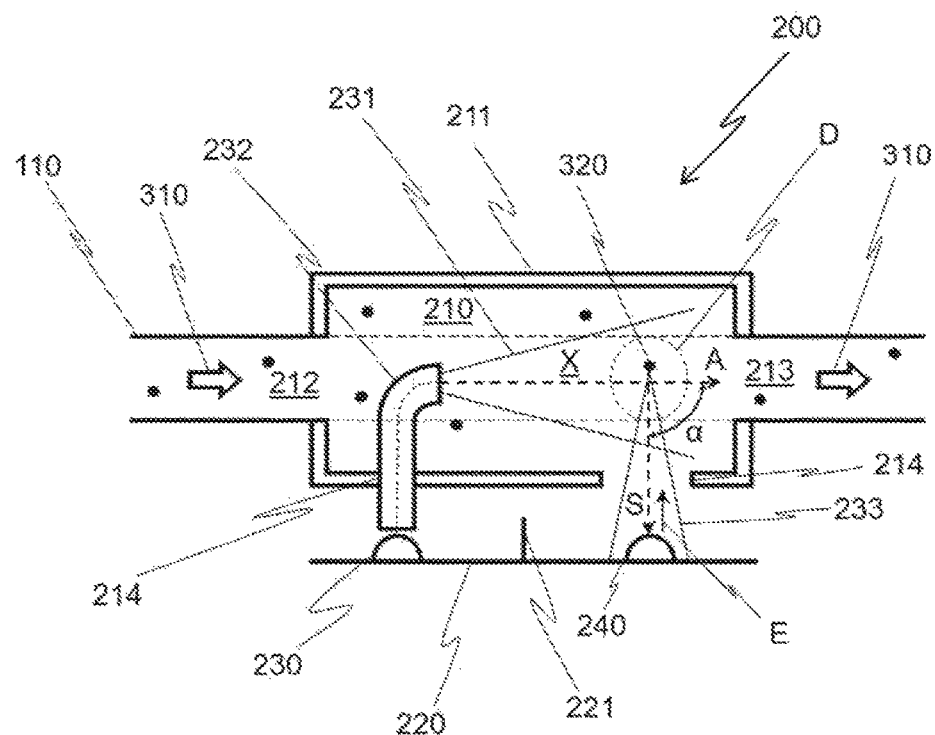
FIG. 2 shows a schematic illustration of a first exemplary embodiment of a scattered light detector according to the invention having a light beam emitted along a flow path and a direct scattered light path.

A schematic illustration of a first exemplary embodiment of a scattered light detector 200 according to the invention can be seen in FIG. 2. The scattered light detector 200 has a test region 210 which is delimited by a test region wall 211 of tubular or cylindrical design. In order to form a flow path 310, indicated by arrows, through which a test fluid can flow, the test region 210 furthermore has a flow inlet 212 and a flow outlet 213. The cross section of the flow path 310 formed within the test region 210, shown by means of dashed lines, corresponds approximately to the cross section of the flow inlet 212 and of the flow outlet 213 or is formed by them. The flow inlet 212 is connectable to a pipe and/or hose system 110 of a suction fire detection system 100, the flow outlet 213 can be arranged directly in front of a suction device 130 of the suction fire detection system 100 (see FIG. 1) or can be connected to the pipe and/or hose system 110. A light emitter 230, in particular a light-emitting diode, and a light receiver 240, in particular a photodiode, are each connected immediately or directly to the front side of a circuit board 220 and are optically separated from one another by a light-opaque separating device 221. The circuit board 220 and the active optical components connected thereto, the light emitter 230 and the light receiver 240, are arranged both outside the test region 210 and also outside the test region wall 211. In this way, unpredictable flow turbulence and particle deposits, which result in soiling of the test region 210 and thus a shorter service life of the scattered light detector 200, can be avoided. In order to establish an optical connection between the light emitter 230 and the light receiver 240 to the test region 210, the test region wall 211 comprises two recesses 214. The light emitter 230 and the light receiver 240 point orthogonally away from the circuit board 220 and are oriented in the direction of the test region 210. A light beam 231 first emitted by the light emitter 230 orthogonally to the front side of the circuit board 220 is deflected by means of an optical waveguide 232 in order to extend in an emission direction A oriented along the flow path 310. For this purpose, the optical waveguide 232 associated with the light emitter 230 is arranged penetrating a recess 214 of the test region wall 211 and deflects the light beam 231 in an emission direction A, here in parallel to the front side of the circuit board 220. A first intersection volume, which is formed by the light beam 231 and the flow path 310, is identified as an intersection region X.

The light receiver 240 is also oriented having its field of view in a receiving direction E extending orthogonally to the front side of the circuit board 220 onto the test region 210, wherein the light beam 231 of the light emitter 230 and the field of view of the light receiver 240 form a second intersection volume, a so-called scattered light center. For scattered light detection, the scattered light center is placed within the flow path 310, whereby a third intersection volume, a detection volume D is defined, in which the light beam 231 of the light emitter 230, the field of view of the light receiver 240, and the flow path 310 of the test fluid intersect. A scattered light component 233 scattered within the detection volume D can be detected by the light receiver 240.

When smoke is generated, smoke particles 320 are contained within the intersection region X, which smoke particles are aspirated from one or more monitoring spaces 300. A part of the light beam 231 incident on a smoke particle 320 is scattered in multiple directions, inter alia at a scattering angle $\alpha$. The scattering angle $\alpha$ shown as an example is in the present case approximately 90°, which means that the scattering just falls in the range of so-called forward scattering ($\alpha=0°-90°$). Between the intersection region X and the light receiver 240, a direct scattered light path S is formed, i.e., a straight, non-reflected, and non-deflected course of a scattered light portion 233 scattered in the intersection region X on a smoke particle 320, which extends through a recess 214 in the test region wall 211 designed as a light passage or gap runs and is incident on the light receiver 240. For optimized detection of the scattered light component 233, the receiving direction E of the light receiver 240 is oriented opposite to the scattered light path S.

Figure 3:
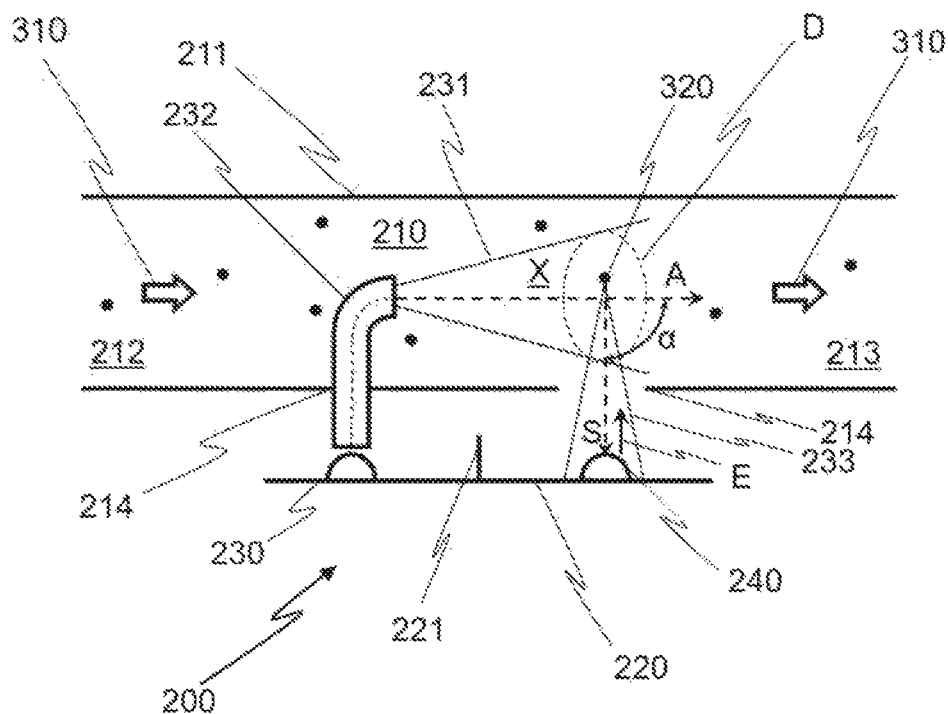
FIG. 3 shows a schematic illustration of a second exemplary embodiment of a scattered light detector according to the invention having a light beam emitted along a flow path and a circular cylindrical test region wall.

A schematic illustration of a second exemplary embodiment of a scattered light detector 200 according to the invention can be seen in FIG. 3. From the first embodiment (see FIG. 2), the second embodiment of the scattered light detector 200 differs due to a test region wall 211 delimiting the test region 210 in the shape of a tube or cylinder and having a circular cylindrical cross-sectional area, the diameter of which corresponds to the diameter of the tube and/or hose system 110. In order to form the test region wall 211 as an integral part of a suction fire detection system 100, it is advantageous to adapt the diameter of the circular cylindrical cross-sectional area to the diameter of the pipe and/or hose system 110, in particular to design it having an identical internal diameter. The test region wall 211 can form an integral component of the pipe and/or hose system 100 as a so-called pipe fitting or a line or flow section of the pipe and/or hose system 110, in particular the supply pipe 113, can be used as a test region wall 211 for the scattered light detector 200. In this embodiment, the flow inlet 212 and the flow outlet 213 terminate directly flush with adjacent lines of the pipe and/or hose system 110 of the suction fire detection system 100. This has the result that the flow path 310 is formed extending essentially within the entire test region 210. Due to the cylindrical geometry of the test region wall 211, corners and/or flow dead spaces, within which soiling due to particle deposits can easily occur, can be avoided. In addition, the flow path 310 is preferably formed within the entire test region 210, as a result of which all particles 320 contained within the test fluid are captured by the flow and are thus more easily transported away out of the test region 210 via the flow outlet 213.

Figure 4:
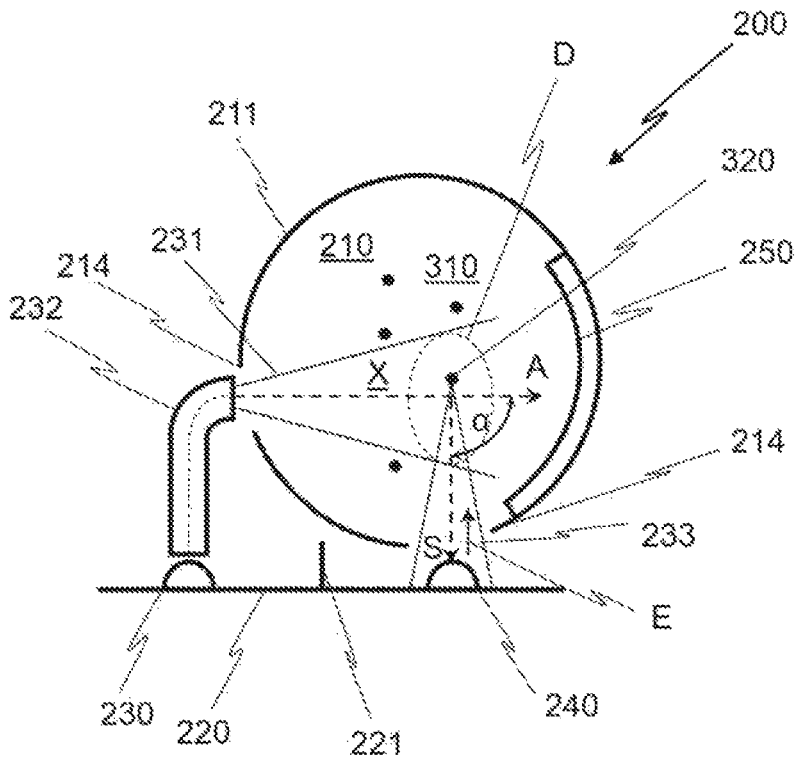
FIG. 4 shows a schematic illustration of a third exemplary embodiment of a scattered light detector according to the invention having a light beam oriented onto the flow path and a direct scattered light path.

A third exemplary embodiment of a scattered light detector 200 according to the invention is schematically shown in FIG. 4. The third embodiment of the scattered light detector 200 also has a test region wall 211 having a circular cylindrical cross-sectional area, which can either be integrated into a pipe and/or hose system of a suction fire detection system 100 (see FIG. 1) or can even be formed as an integral component of the pipe and/or hose system 110 (see FIG. 3). A flow path 310 is formed within the test region 210 and extends along the center axis of the test region wall 211, which is cylindrical or has a circular cylindrical cross section. Unlike the second embodiment (see FIG. 3) the light beam 231 emitted by the light emitter 230 is oriented here onto the flow path 310 and extends in an emission direction A essentially radially or orthogonally in relation to the flow path 310. In this configuration, it is possible not only to arrange the circuit board 220 having the light receiver 240 and the light emitter 230, but rather additionally the optical waveguide 232, which deflects the light beam 231 emitted by the light emitter 230, outside the test region 210 and outside the test region wall 211. As a result, all optical components, active as well as passive, are located outside the test region 210, which enables a disturbance-free, low-turbulence test fluid flow along the flow path 310. This contributes to an improved detection of the scattered light that is scattered and, due to less soiling, to a longer service life of the scattered light detector 200. Expediently, a light trap 250 for absorbing a non-scattered light component of the light beam 231 transmitted by the light emitter 230 can also be arranged within the test region 210. The light trap 250 is preferably embodied as a complete or partial coating of the inner surface of the test region wall 211, but could alternatively also be arranged as an optical component within the test region 210.

Figure 5:
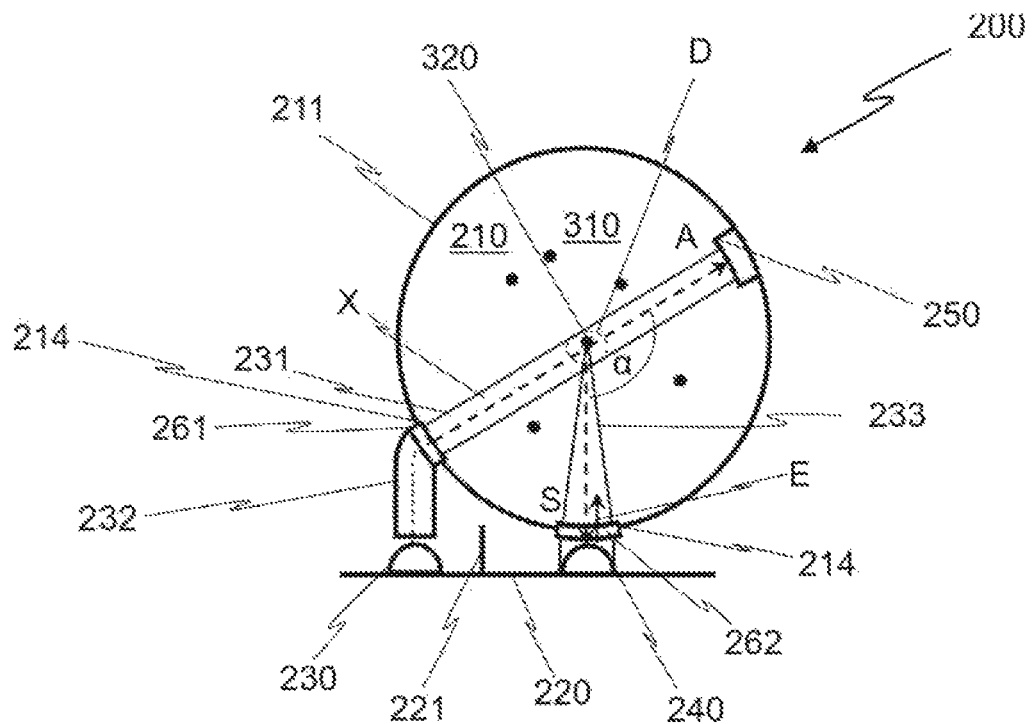
FIG. 5 shows a schematic illustration of a fourth exemplary embodiment of a scattered light detector according to the invention having a light beam oriented and focused onto the flow path and a direct and focused scattered light path.

FIG. 5 shows a schematic illustration of a fourth exemplary embodiment of a scattered light detector 200 according to the invention. Compared to the third embodiment (see FIG. 4), the scattered light detector 200 shown here differs on the one hand in that the light beam 231 emitted by the light emitter 230 and oriented radially onto the flow path 310 is focused by means of a first flat or planar optical unit 261, in particular a converging lens or Fresnel lens. For this purpose, the first optical unit 261 is arranged within a recess 214 of the test region wall 211 and adjoins the optical waveguide 232, which deflects the light beam 231 emitted by the light emitter 230. As shown, the width of the light beam 231 is reduced by the first optical unit 261 and the light beam 231 itself is parallelized. Correspondingly, an intersection region X, which is smaller than a nonfocused light beam, results between the flow path 310 of the test fluid and the light beam 231, whereby more precise detection of the scattered light that is scattered is possible. In addition, an optional light trap 250 can be designed having a correspondingly smaller size. The first optical unit 261 could also be designed as simple window glass in order to only close the opening 214, so that the test fluid cannot escape through the recess 214.

On the other hand, the direct scattered light path S, which extends between the intersection region X or the detection volume D and the light receiver 240, is also focused by means of a second flat or planar optical unit 262, in particular a converging lens or Fresnel lens. The scattered light component 233 incident on the second optical unit 262 is bundled and focused on the light receiver 240. In this way, it is possible to "intercept" and detect scattered light components that would otherwise pass by the light receiver 240. In addition, the emission direction A of the light emitter 230 in this embodiment does not extend in parallel to the front side of the circuit board 220, so that the scattering angle $\alpha$ shown here by way of example, at which the light beam 231 transmitted by the light emitter 230 is scattered on a particle 320, is greater than 90°, which is why the present case can be referred to as so-called backward scattering ($\alpha>90°$). Here, too, it is fundamentally conceivable that the second optical unit 262 is alternatively formed as simple window glass.

Figure 6:
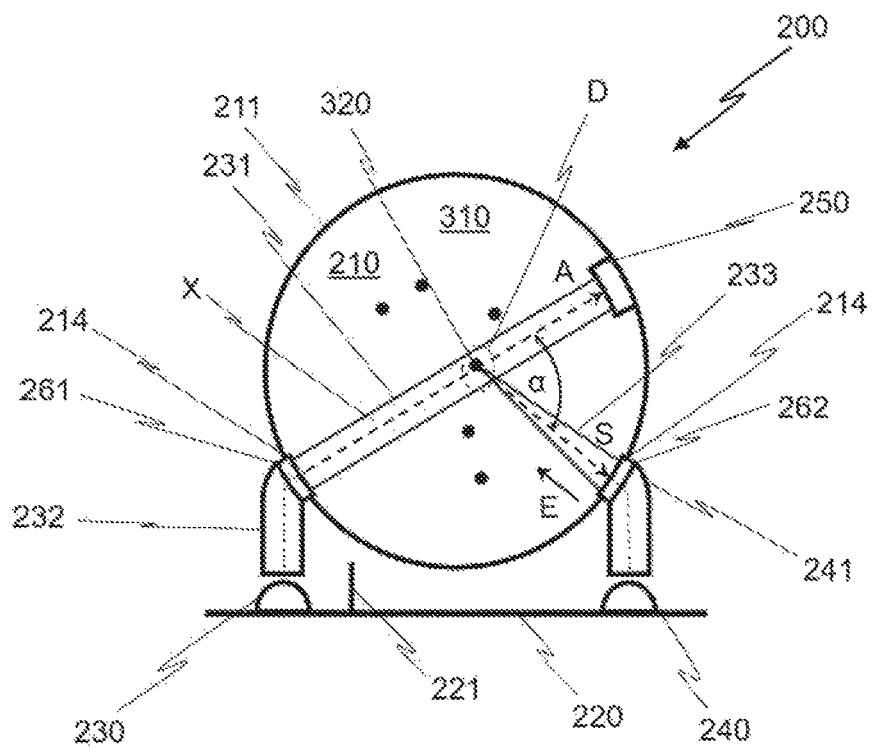
FIG. 6 shows a schematic illustration of a fifth exemplary embodiment of a scattered light detector according to the invention having a light beam oriented and focused onto the flow path and an indirect and focused scattered light path.

A schematic illustration of a fifth exemplary embodiment of a scattered light detector 200 according to the invention having an indirect and focused scattered light path S can be seen in FIG. 6. From the fourth embodiment described above (see FIG. 5), the present fifth embodiment again differs due to the scattering angle α. According to the illustration, the light beam 231 emitted by the light emitter 230 is scattered on a particle 320 at a scattering angle α of less than 90°, so that the present scattering is to be classified in the range of the forward scattering. The scattered light component 233 scattered at the scattering angle α extends along an indirect scattered light path S, i.e., the scattered light component 233 extending along the scattered light path S is deflected by means of an optical waveguide 241 associated with the light receiver 240 and arranged in its field of view, so that it has a "curved" course. In this way, the area of the printed circuit board 220 required for detecting a forward scattered light component 233 scattered at an angle between 0° and 90° can advantageously be reduced. By deflecting the scattered light component 233 by means of the optical waveguide 241 associated with the light receiver 240, the distance required between the light emitter 230 and the light receiver 240 on the circuit board 220 is reduced, whereby it results as smaller overall and thus requires less space. In particular, the deflection by means of the optical waveguide 241 makes it possible in the first place to detect forward scattering via a scattered light detector 200 having a single circuit board 220, the front side of which has both the light emitter 230 and the light receiver 240. For focusing, a second optical unit 262 is provided within the scattered light path S, which is arranged in a recess 214 of the test region wall 211 and in front of the optical waveguide 241 with respect to the direction of the scattered light path S.

Figure 7:
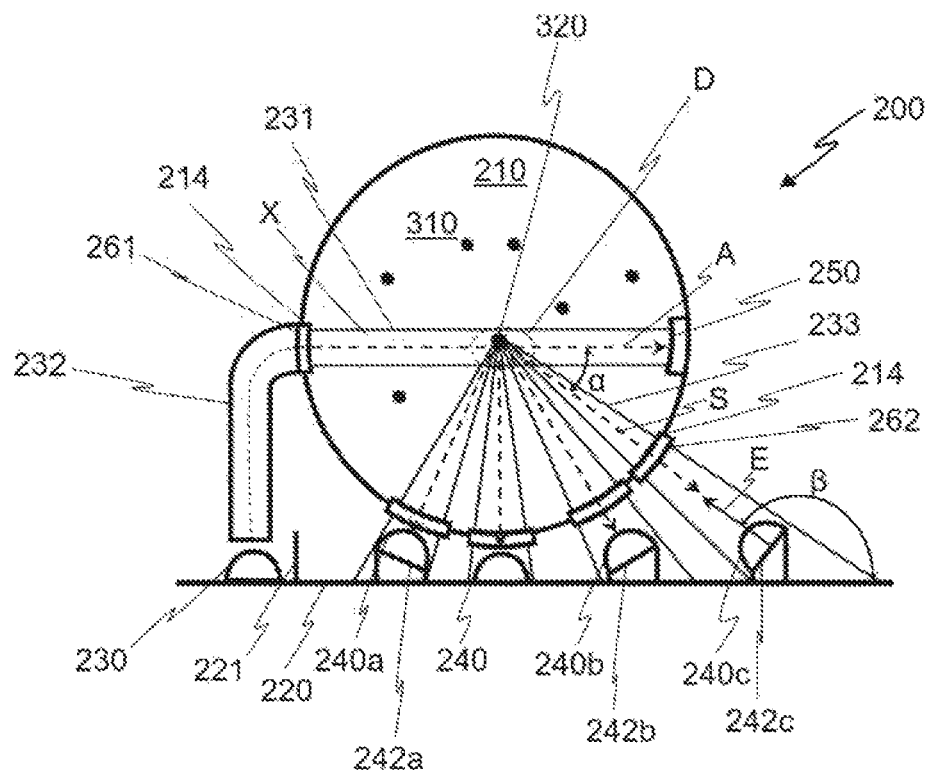
FIG. 7 shows a schematic illustration of a sixth exemplary embodiment of a scattered light detector according to the invention having a light beam oriented and focused onto the flow path and multiple secondary light receivers, which are aligned for multidetection at a respective detection angle.

FIG. 7 shows a schematic illustration of a sixth exemplary embodiment of a scattered light detector 200 according to the invention, which is provided for multidetection. Similar to the fifth embodiment (see FIG. 6), a light beam 231 emitted by the light emitter 230 is deflected by means of an optical waveguide 232 and oriented onto the flow path 310 extending within the test region 210, wherein the light beam 231 is focused by means of a first optical unit 261. As shown in the figure, the light beam 231, unlike in the fifth embodiment (see FIG. 6), is deflected by an angle of approximately 90°, so that the light beam 231 extends essentially in parallel to the front side of the printed circuit board 220. The light beam 231 forms the intersection region X together with the flow path 310. In addition to the light emitter 230 and the light receiver 240, which are each directly, i.e., immediately connected to the front side of the circuit board 220, further secondary light receivers 240a, 240b, 240c are each also connected indirectly in this figure, i.e. via additional substructures or surface-mounted components 242a, 242b, 242c, to the front side of the circuit board 220. The surface-mounted components 242a, 242b, 242c are designed here, for example, as a solid support base, the supporting surface of which is pivoted by a respective detection angle β with respect to the front side of the printed circuit board 220 and is connected to the respective associated secondary light receiver 240a, 240b, 240c, so that the secondary light receivers 240a, 240b, 240c are themselves aligned for a multidetection at a respective detection angle β. The detection angle β spans between the front side of the circuit board 220 and the respective receiving direction E. Alternatively, it is conceivable that the secondary light receivers 240a, 240b, 240c are each connected directly, i.e., without additional substructures or surface-mounted components 242a, 242b, 242c, to the front side of the circuit board 220. By means of suitable optical units 262, sufficient incidence of light on the secondary light receivers 240a, 240b, 240c can be ensured even if the secondary receivers are not adjusted. While the indirect connection and alignment of the secondary light receivers 240a, 240b, 240c with the help of substructures can achieve a slightly higher degree of efficiency in light reception, the direct connection represents a variant that is cheaper to manufacture.

The respective detection angles β of the light receiver 240 and the secondary light receivers 240a, 240b, 240c are selected accordingly to form a common scattered light center with the light beam 231 within the intersection region X and thus to form a common detection volume D. Starting from a particle 320 located within the detection volume D, a direct scattered light path S of a scattered light component 233 scattered at an associated scattering angle α is incident on the light receiver 240 or the secondary light receivers 240a, 240b, 240c (shown here by way of example using the secondary light receiver 240c). Multiple second optical units 262, which are arranged within corresponding recesses 214, are each used to focus the scattered light path S. Due to the flexible arrangement options of the light receiver 240 and the one or more secondary light receivers 240a, 240b, 240c, these can be arranged on a common circuit board 220 to save space, and at the same time increase the evaluation options of the scattered light detector 200. In particular, the scattering-angle-α-dependent scattered light distribution can be included in the evaluation, whereby, for example, fire variables can be distinguished from deception variables (dust or vapor particles).

Figure 8:
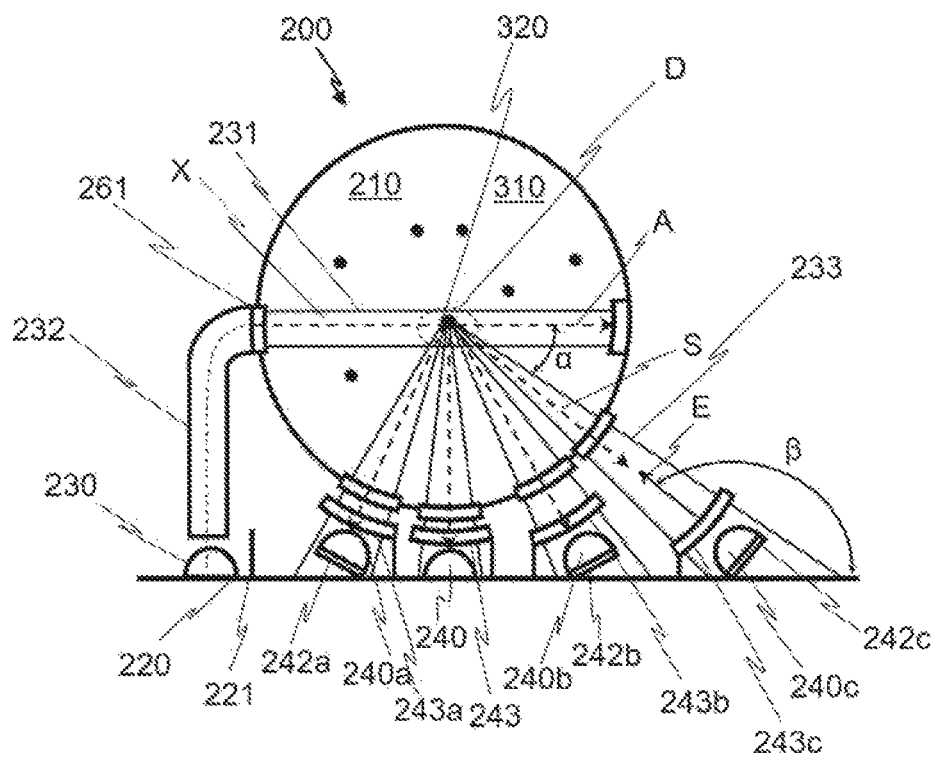
FIG. 8 shows a schematic illustration of a seventh exemplary embodiment of a scattered light detector according to the invention having multiple secondary light receivers which are aligned for multidetection at a respective detection angle, wherein a polarization filter is arranged in a respective direct scattered light path.

A schematic illustration of a seventh exemplary embodiment of a scattered light detector 200 according to the invention, which is provided for multi-detection, can be seen in FIG. 8 As also in the sixth embodiment (see FIG. 7) the light receiver 240 and the secondary light receivers 240a, 240b, 240c are aligned at a respective detection angle β to form a common detection volume D. The secondary light receivers 240a, 240b, 240c are each indirectly connected to the printed circuit board 220 via an associated surface-mounted component 242a, 242b, 242c, but formed here as an inclined plate. In addition, according to the present embodiment, polarization filters 243, 243a, 243b, 243c are also arranged within the respective directly extending and focused scattered light path S. The planes of polarization of each two polarization filters 243, 243a, 243b, 243c are preferably orthogonal to one another, whereby additional analysis information can be obtained on the basis of the respectively filtered detected scattered light component 233.

Figure 9:
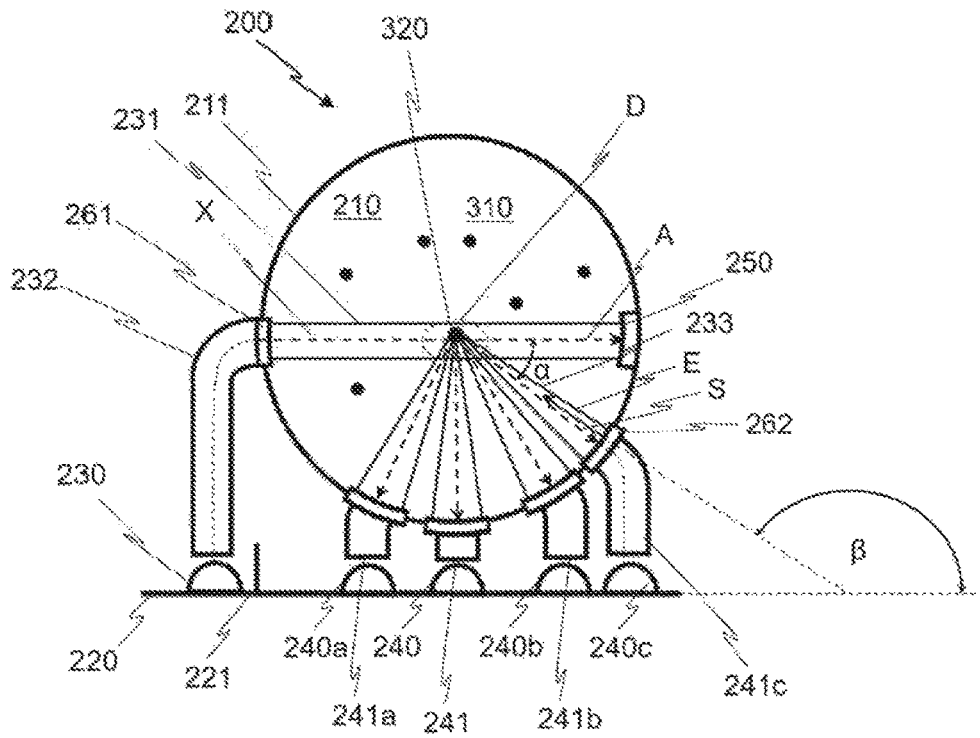
FIG. 9 shows a schematic illustration of an eighth exemplary embodiment of a scattered light detector according to the invention having multiple secondary light receivers, which are aligned for a multidetection at a respective detection angle and a respective indirect scattered light path is formed by means of an optical waveguide in each case.

FIG. 9 shows a schematic illustration of an eighth exemplary embodiment of a scattered light detector 200 according to the invention, which is provided for a multidetection. Unlike the sixth and seventh embodiments described above (see FIGS. 7, 8) here the respective scattered light path S has a "curved" course or is formed indirectly. By using a respective optical waveguide 241, 241a, 241b, 241c, it is possible to adjust the detection angle β by deflecting the respective scattered light component 233 without using additional surface-mounted components 242a, 242b, 242c (see FIGS. 7 and 8). The secondary light receivers 240a, 240b, 240c can thus also be connected directly, i.e., immediately and without additional substructures, to the front side of the circuit board 220. In addition, in this embodiment the necessary distance between the secondary light receivers 240a, 240b, 240c and the light emitter 230 to detect the scattered light component 233 scattered in the associated scattering angle α is smaller, so that the circuit board 220 can be designed with a smaller area in favor of an overall smaller scattered light detector 200.

The different, described embodiments according to FIGS. 2 to 9 represent only an exemplary excerpt from the many possible modifications of a scattered light detector 200 according to the invention. Further embodiments are conceivable in any combination of the proposed structural and/or arrangement and/or modification options. In particular, a flexible structure enables an adapted use of the scattered light detector 200 for a suction fire detection system 100 in that the light beam 231 of the light emitter 230 can be directed onto the flow path 310 of the test fluid or can be aligned along the flow path of the test fluid. By using optical waveguides 232, 241, 241a, 241b, 241c, the size of the circuit board 220 and thus the size of the scattered light detector 200 can be reduced overall, so that a multidetection using multiple secondary light receivers 240a, 240b, 240c can be simplified or implemented at all. By arranging all active optical components (light emitter 230, light receiver 240, secondary light receivers 240a, 240b, 240c) on a single circuit board 220, additional manufacturing costs are saved and the structure of the scattered light detector 200 is considerably simplified. The possibility of arranging all active optical components (light emitter 230, light receiver 240, secondary light receiver 240a, 240b, 240c) as well as passive optical components (optical waveguides 232, 241, 241a, 241b, 241c, optical units 261, 262, polarization filters 243, 243a, 243b, 243c) outside of the test region 210 and outside or flush with the test region wall 211 avoids soiling of the test region 210 by particle deposits, which occur more often in the case of suction fire detection systems 100, and the service life of the scattered light detector 200 is increased as a result. Modifications, such as the use of optical units 261, 262 or polarization filters 243, 243a, 243b, 243c, improve the detection accuracy and the evaluation options.

Figure 10:
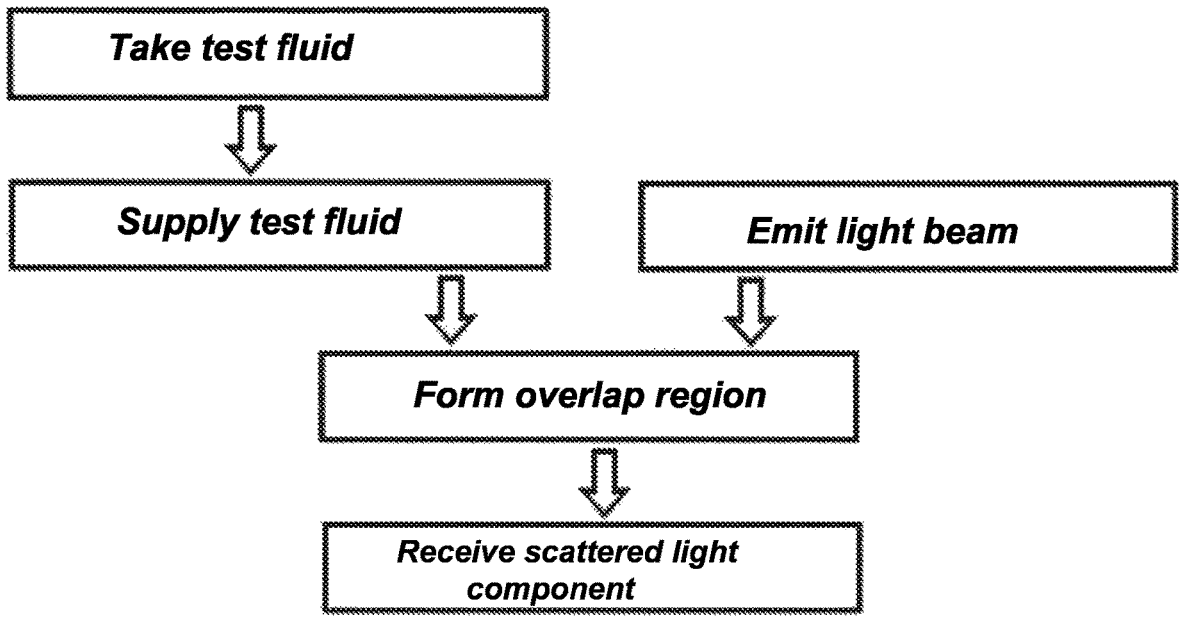
FIG. 10 shows an exemplary flow chart of a method according to the invention.

To illustrate a method according to the invention for detecting particles 320 contained in a test fluid using a scattered light detector 200, preferably according to one of the exemplary embodiments described above, FIG. 10 shows an exemplary, schematic flow chart of such a method. The method according to the invention is preferably carried out continuously for constant monitoring of a monitoring space 300. To make it easier to understand, the method sequence is explained step-by-step below with the aid of a single quantity of test fluid taken.

First, a quantity of test fluid is taken from one or more monitoring spaces 300 via one or more suction openings 120 of a suction fire detection system 100. The quantity of test fluid taken is then supplied to scattered light detector 200 by a fluid-conducting pipe and/or hose system 110 (see also FIG. 1 in this regard). The scattered light detector 200, more precisely its test region 210, is integrated for this purpose in the tube and/or hose system 110 or formed integrally with this, so that a flow path 310 is created along a flow section of the pipe and/or hose system 110, which then functions as a test region 210. An intersection region X is then formed within the test region 210 and therefore within the pipe and/or hose system 110 in that a light emitter 230 emits a light beam 231 in a radiation direction A oriented onto the flow path 310 or along the flow path 310. The light receiver 240 is oriented towards the intersection region (X) to form a detection volume (D). If particles 320 are present within the aspirated amount of test fluid, a scattered light component 233 scattered on a particle 320 within the detection volume D is received by the light receiver 240 (see also FIG. 2 in this regard, for example).

In the context of the invention, it is thus provided that the intersection region X is formed within the pipe and/or hose system 110 of a suction fire detection system 100, in which both the light beam 231 sent by the light emitter 230 and the flow path 310 carrying the test fluid meet within a flow section of the pipe and/or hose system 110 and at the same time the field of view of the light receiver 240 in a receiving direction E is oriented towards it. According to the invention, the scattered light center, the intersection volume between the field of view of the light receiver 240 and the light beam 231 of the light emitter 230, is thus formed within a flow section of the pipe and/or hose system 110. A scattered light path 310 extending between the intersection region X and the light receiver 240 can optionally and/or if needed be formed directly or indirectly here.

Further steps for evaluating the detected scattered light component for the presence of a fire or a fire hazard or the risk of a fire developing are sufficiently known from the prior art.

REFERENCE SIGNS 100 suction fire detection system
110 pipe and/or hose system
111 first pipe branch
112 second pipe branch
113 supply line
120 suction opening
130 suction device
140 housing
200 scattered light detector
210 test region
211 test region wall
212 flow inlet
213 flow outlet
214 recess
220 circuit board
221 separating device
230 light emitter
231 light beam
232 optical waveguide
233 scattered light component
240 light receiver
240a, 240b, 240c secondary light receivers
241 optical waveguide
241a, 241b, 241c optical waveguides
242a, 242b, 242c surface-mounted components
243 polarization filter
243a, 243b, 243c polarization filters
250 light trap
261 first optical unit
262 second optical unit
300 monitoring space
310 flow path
320 smoke particles
A radiation direction
D detection volume
E reception direction
P direction of flow
S scattered light path
X overlap region
α scattering angle
β detection angle

The invention claimed is:

1. A scattered light detector (200) for detecting particles and having
   a test region (210) which has a flow inlet (212) and a flow outlet (213) to form a flow path (310) through which the test fluid can flow, a light emitter (230) which emits a light beam (231) in an emission direction (A), wherein the emitted light beam (231) forms an intersection region (X) with the flow path (310), a light receiver (240) for receiving a component of scattered light (233) scattered by particles (320) in the intersection region (X), a circuit board (220), wherein the light emitter (230) and the light receiver (240) are connected to the circuit board (220), characterized in that the light beam (231) emitted by the light emitter (230) is guided into the test region (210) by means of an optical waveguide (232) deflecting the light beam (231), the light receiver (240) is arranged in such a way that a direct or indirect scattered light path (S) extends between the light receiver (240) and the intersection region (X), the test region (210) is delimited by a test region wall (211), wherein the test region wall (211) has one or more recesses (214) for accommodating optical components or for creating one or more light passages and the light receiver (240) or the light emitter (230) or the optical wave guide (232, 241) or the first optical unit (261) or the second optical unit (262) or further optical components are arranged outside the test region (210).

2. The scattered light detector (200) according to claim 1, characterized in that
the light beam (231) emitted by the light emitter (230) extends in an emission direction (A) oriented along the flow path (310).

3. The scattered light detector (200) according to claim 1, characterized in that
the light beam (231) emitted by the light emitter (230) extends in an emission direction (A) oriented onto the flow path (310).

4. The scattered light detector (200) according to claim 1, characterized in that
the indirect scattered light path (S) extending between the light receiver (240) and the intersection region (X) is formed by means of an optical waveguide (241) which deflects the scattered light component (233).

5. The scattered light detector (200) according to claim 1, characterized in that
a first optical unit (261) for focusing the light beam (231) is arranged between the light emitter (230) and the intersection region (X) or a second optical unit (262) for focusing a scattered light component (233) scattered along the scattered light path (S) is arranged between the light receiver (240) and the intersection region (X).

6. The scattered light detector (200) according to claim 5, characterized in that
the circuit board (220) having the light emitter (230) and the light receiver (240) is arranged outside the test region wall (211) delimiting the test region (210).

7. The scattered light detector (200) according to claim 5, characterized in that
a light passage or a non-reflective optical component is arranged within the direct scattered light path (S) extending between the light receiver (240) and the intersection region (X) or the indirect scattered light path (S) extending between the light receiver (240) and the intersection region (X) by means of an optical waveguide (241) arranged within one of the recesses (214).

8. The scattered light detector (200) according to claim 1, characterized in that
one or more additional light receivers as secondary light receivers (240a, 240b, 240c) are connected to the circuit board (220).

9. The scattered light detector (200) according to claim 8, characterized in that
the one or more secondary light receivers (240a, 240b, 240c) are arranged in such a way that a direct or indirect scattered light path (S) extends between the respective secondary light receiver (240a, 240b, 240c) and the intersection region (X).

10. The scattered light detector (200) according to claim 8, characterized in that
one or more second optical units (262) for focusing a scattered light component (233) are arranged in a respective scattered light path (S) between the one or more secondary light receivers (240a, 240b, 240c) and the intersection region (X).

11. The scattered light detector (200) according to claim 1, characterized in that
the scattered light detector (200) further comprises a pipe or hose system (110) for connecting the scattered light detector (200) in a fluid-conducting manner to one or more suction openings (120) which are arranged within one or more monitoring spaces (300) for suctioning a test fluid and a suction device (130) for generating a flow or a negative pressure within the pipe or hose system (110), wherein the test region (210) of the scattered light detector (200) is formed as an integrated part of the pipe or hose system (110), by the test region (210) being formed as a flow section of the pipe or hose system (110).

12. The scattered light detector (200) according to claim 11, characterized in that
a test region wall (211) delimiting the test region (210) has a flow inlet (212) which is used to form or align a flow path (310) within the test region (210), in the flow direction (P) of the test fluid, is arranged in front of the test region (210) and has a flow outlet (213) which, in the flow direction (P) of the test fluid, is arranged after the test region (210) and in front of the suction device (130).

13. A method for detecting particles contained in a test fluid using a scattered light detector (200), which scattered light detector (200) has a light emitter (230) for forming an intersection region (X) with the test fluid in a test region (210) and a light receiver (240) for detecting scattered light scattered from within the intersection region (X), the light emitter (230) and the light receiver (240) being connected to a circuit board (220), wherein a test fluid is continuously taken from one or more monitoring spaces (300) by means of one or more suction openings (120) and is supplied to the scattered light detector (200) by means of a fluid-conducting pipe or hose system (110), characterized in that the intersection region (X) is formed within the pipe or hose system (110) and the light receiver (240) is oriented onto the intersection region (X) to form an intersection region (D), wherein a flow path (310) guiding the test fluid is created along a flow section of the pipe or hose system (110)

the light emitter (230) emits a light beam (231) in an emission direction (A) oriented onto the flow path (310) or along the flow path (310), wherein the emitted light beam (231) forms the intersection region (X) with the flow path (310)

the test region (210) is delimited by a test region wall (211), wherein the test region wall (211) has one or more recesses (214) for accommodating optical components or for creating one or more light passages and the light receiver (240) or the light emitter (230) or an optical wave guide (232, 241) or a first optical unit (261) or a second optical unit (262) or further optical components are arranged outside the test region (210).

\* \* \* \* \*